United States Patent
Wintergerst et al.

(10) Patent No.: US 8,656,407 B2
(45) Date of Patent: Feb. 18, 2014

(54) PROFILING INPUT / OUTPUT OPERATIONS

(75) Inventors: Michael Wintergerst, Muehlhausen (DE); Dietrich Mostowoj, Ludwigshafen (DE); Ralf Schmelter, Wiesloch (DE); Steffen Schreiber, Frankenthal (DE); Johannes Scheerer, Heidelberg (DE)

(73) Assignee: SAP AG, Walldorf (DE)

( * ) Notice: Subject to any disclaimer, the term of this patent is extended or adjusted under 35 U.S.C. 154(b) by 707 days.

(21) Appl. No.: 12/910,486

(22) Filed: Oct. 22, 2010

(65) Prior Publication Data

US 2012/0102488 A1     Apr. 26, 2012

(51) Int. Cl.
*G06F 9/46*  (2006.01)
*G06F 9/455*  (2006.01)
*G06F 13/00*  (2006.01)
*G06F 12/00*  (2006.01)

(52) U.S. Cl.
USPC ............. 718/106; 718/1; 711/114; 707/828

(58) Field of Classification Search
None
See application file for complete search history.

(56) References Cited

U.S. PATENT DOCUMENTS

| | | | | |
|---|---|---|---|---|
| 5,129,084 | A * | 7/1992 | Kelly et al. | 718/104 |
| 6,842,770 | B1 * | 1/2005 | Serlet et al. | 709/203 |
| 8,296,420 | B2 * | 10/2012 | Wujuan et al. | 709/224 |
| 2006/0075306 | A1 * | 4/2006 | Chandrasekaran | 714/38 |
| 2008/0244546 | A1 * | 10/2008 | Schmelter et al. | 717/158 |

OTHER PUBLICATIONS

U.S. Appl. No. 12/631,675, filed Dec. 4, 2009, Schmelter, et al.
U.S. Appl. No. 12/631,694, filed Dec. 4, 2009, Schmelter, et al.
U.S. Appl. No. 12/631,701, filed Dec. 4, 2009, Schmelter, et al.
U.S. Appl. No. 12/631,704, filed Dec. 4, 2009, Wintergerst, et al.
Project Summary—tptp.performance, "Tracing & Profiling Tools" [online]. The Eclipse Foundation 2010 [retrieved on Oct. 4, 2010]. Retrieved from the Internet: <URL: http://www.eclipse.org/projects/project_summary.php?projectid=tptp.performance.
Java Profiler—.NET Profiler, "YourKit Java Profiler Features:" [online]. 2003-2010 YourKit, LLC [retrieved on Oct. 4, 2010]. Retrieved from the Internet: ,URL: http://yourkit.com/features/index.jsp.

* cited by examiner

*Primary Examiner* — Meng-Ai An
*Assistant Examiner* — Wissam Rashid
(74) *Attorney, Agent, or Firm* — Fish & Richardson P.C.

(57) ABSTRACT

Implementations of the present disclosure provide methods including executing a virtual machine configured to execute a plurality of applications and perform a plurality of I/O operations; storing meta information for a first I/O operation performed by the virtual machine in an I/O information holder for the virtual machine; receiving a request to begin an I/O profiling session on the virtual machine after storing the meta information; and reporting an I/O event record for a second I/O operation performed by the virtual machine using the meta information for the first I/O operation, wherein the second I/O operation is performed after beginning an I/O profiling session on the virtual machine.

20 Claims, 16 Drawing Sheets

| Name | Opened | Closed | Read Bytes | Written Bytes | Read Time | Write Time |
|---|---|---|---|---|---|---|
| :\2ee\c.u.s.er\bir\ext\ec~javd~isll\l'ib\jstl-1_2.jar | 3,967 | 3,966 | 5.09 MB | 0 | 66.3 ms | 0 ns |
| e:\cluster\bir\ext\mai-activction-ialk\w3c_http.jar | 420 | 419 | 71 | 0 | 11.7 us | 0 ns |
| ,\j00\j2ee\cluster\bin\ex.\j2eeca\lib\connector.jar | 419 | 418 | 14.4 kB | 0 | 623 us | 0 ns |
| j2ee\cluster\or\ex.\stax_api\private\sjsxp.jar | 416 | 415 | 138 kB | 0 | 1.47 ms | 0 ns |
| j2ee\cluster\bir\ext\sdo\lib\sap.com~sdo~api.jar | 415 | 414 | 8.39 kB | 0 | 252 us | 0 ns |
| private\sap.com~tc~je~webservices_lib~impl.jar | 415 | 414 | 839 kB | 0 | 7.42 ms | 0 ns |
| 1\j00\j2ee\cluster\bir\ext\jaxb20\l'ib\jaxb-xjc.jar | 414 | 413 | 472 | 0 | 45.3 us | 0 ns |
| :l\tc~bl~base_webservices_lib\lib\jaxws-tools.jar | 414 | 413 | 284 | 0 | 15.4 us | 0 ns |
| p\private\sap.com~tc~je~container_api~impl.jar | 414 | 413 | 82.8 kB | 0 | 978 ms | 0 ns |
| \JC0\j2ee\cluster\bin\ext\jaxb20\lib\jaxb-impl.jar | 413 | 412 | 703 kB | 0 | 31.3 ms | 0 ns |
| f\lib\sap.com~tc~sapxmltoolkit~sapxmltoolkit.jar | 413 | 412 | 518 kB | 0 | 5.55 ms | 0 ns |
| _lo\lib\sap.com~tc~bl~base_webservices_lib.jar | 411 | 409 | 269 kB | 0 | 12.9 ms | 0 ns |
| a\lib\private\sap.com~tc~je~sec~ume~api~impl.jar | 410 | 409 | 72.0 kB | 0 | 1.21 ms | 0 ns |
| \j2ee\cluster\oin\ex.\jrrs\lib\private\jmsclient.jar | 409 | 408 | 211 kB | 0 | 2.81 ms | 0 ns |
| \CET\J00\j2ee\cluster\bin\ext\jms_cpi\lib\jms.jar | 407 | 406 | 13.1 kB | 0 | 643 us | 0 ns |
| 0\j2ee\cluster\bin\ext\p4lib\sap.com~p4lib.jar | 406 | 405 | 134 kB | 0 | 911 us | 0 ns |
| api\lio\private\sap.com~tc~je~cross_api~API.jar | 406 | 405 | 27.0 kB | 0 | 423 us | 0 ns |
| ..\lib\private\sap.com~tc~je~security_api~impl.jar | 406 | 405 | 44.7 kB | 0 | 700 us | 0 ns |

FIG. 9A

| ID | FD | Read Bytes ▼ | Read Time | Read Operations | Opened At | Closed At | Opening Thread ID | Opening Thread |
|---|---|---|---|---|---|---|---|---|
| 15 | 4,028 | 3.66 kB | 113 us | 11 | 4/16/10 10:13:43 AM | 4/16/10 10:13:44 AM | 35 | Service Runner [ |
| 4 | 3,980 | 1.63 kB | 67.2 us | 6 | 4/16/10 10:13:06 AM | 4/16/10 10:13:07 AM | 96 | Service Runner [ |
| 6 | 4,812 | 1.60 kB | 60.7 us | 5 | 4/16/10 10:13:13 AM | 4/16/10 10:13:14 AM | 36 | Service Runner [ |
| 5 | 4,812 | 1.31 kB | 57.9 us | 3 | 4/16/10 10:13:10 AM | 4/16/10 10:13:12 AM | 30 | Service Runner [ |
| 3 | 4,244 | 775 | 13.2 us | 1 | 4/16/10 10:12:57 AM | 4/16/10 10:12:59 AM | 76 | Service Runner [ |
| 32 | 7,092 | 406 | 29.3 us | 2 | 4/16/10 10:14:20 AM | | 30 | Deploy Parallel S |
| 1 | 3,808 | 95 | 14 us | 1 | 4/16/10 10:12:37 AM | 4/16/10 10:12:39 AM | 1 | main |
| 367 | 9,336 | 0 | 0 ns | 0 | 4/16/10 10:15:38 AM | 4/16/10 10:15:38 AM | 14 | Application [1] |
| 368 | 9,336 | 0 | 0 ns | 0 | 4/16/10 10:15:38 AM | 4/16/10 10:15:38 AM | 153 | Application [16] |
| 369 | 9,336 | 0 | 0 ns | 0 | 4/16/10 10:15:38 AM | 4/16/10 10:15:38 AM | 18 | Application [5] |
| 370 | 9,336 | 0 | 0 ns | 0 | 4/16/10 10:15:39 AM | 4/16/10 10:15:39 AM | 25 | Application [12] |
| 371 | 9,336 | 0 | 0 ns | 0 | 4/16/10 10:15:39 AM | 4/16/10 10:15:39 AM | 19 | Application [6] |
| 372 | 9,336 | 0 | 0 ns | 0 | 4/16/10 10:15:39 AM | 4/16/10 10:15:39 AM | 23 | Application [10] |
| 373 | 9,336 | 0 | 0 ns | 0 | 4/16/10 10:15:39 AM | 4/16/10 10:15:39 AM | 14 | Application [1] |

FIG. 9B

| Method ▲ | Self Read Bytes | Total Read Bytes | Self Written Bytes | Total |
|---|---|---|---|---|
| <no stack> | | | | |
| com.sap.engine.boot.Start.main(java.lang.String[ ])void ▶ | 0 | 0 | 0 | |
| com.sap.engine.boot.Start.ebcdicConvert(java.lang.String ▶ | 0 | 10.3 MB | 0 | |
| com.sap.engine.boot.SystemProperties.getProperty(jc ▶ | 0 | 2.28 kB | 0 | |
| java.lang.ClassLoader.loadClassInternal(java.lang. ▶ | 0 | 1.79 kB | 0 | |
| java.lang.ClassLoader.loadClassInternal(java.lang..Strin ▶ | 0 | 502 | 0 | |
| com.sap.engine.oos.StartFrame.<init>(java.lang.String[ ] ▶ | 0 | 53.1 kB | 0 | |
| com.sap.engine.oos.StartFrame.work()int ▶ | 0 | 10.3 MB | 0 | |
| java.lang.ClassLoader.loadClassInternal(java.lang.String)) ▶ | 0 | 1.68 kB | 0 | |
| gine.core.thread.execJlier.CentralExecutor$SingleThread.run ▶ | 0 | 5.72 kB | 0 | |
| com.sap.engine.core.thread.irrpl3.SingleThread.run()void ▶ | 0 | 15.5 MB | 0 | |
| com.sap.engine.core.thread.irrpl5.SingleThread.run()void ▶ | 0 | 57.8 MB | 0 | |
| com.sap.engine.frame.core.locd.res.JarThread.run()void ▶ | 0 | 0 | 0 | |
| com.sap_dsr_statistics.DSRPortUpdater.run()void ▲ | 0 | 1 | 0 | |

| ID | Name | Opened ▼ | Closed | Read Bytes | Written Bytes | Read Time | Write Time |
|---|---|---|---|---|---|---|---|
| 18 | Application [5] | 17,063 | 13,334 | 3.31 MB | 7.43 kB | 40.0 ms | 5.35 ms |
| 25 | 'Container Started' Event Handler | 16,141 | 13,714 | 3.10 MB | 584 kB | 36.5 ms | 18.9 ms |
| 23 | JMS Session 4 (0) | 15,852 | 13,325 | 2.10 MB | 1.88 kB | 24.0 ms | 211 us |
| 153 | Application [16] | 15,586 | 12,700 | 2.60 MB | 0 | 29.5 ms | 0 ns |
| 14 | Application [1] | 15,509 | 13,101 | 2.39 MB | 1.26 kB | 30.5 ms | 181 us |
| 19 | Application [6] | 10,202 | 8,461 | 1.97 MB | 48.7 kB | 24.0 ms | 1.26 ms |
| 1 | main | 938 | 53 | 10.6 MB | 4.66 kB | 185 ms | 1.99 ms |
| 41 | Service Runner [cluster] | 323 | 156 | 6.02 MB | 131 kB | 134 ms | 6.57 ms |
| 96 | Service Runner [appclient] | 282 | 211 | 2.51 MB | 403 kB | 15.5 ms | 36.3 ms |
| 108 | Event Processor [msp] | 264 | 183 | 3.87 MB | 192 kB | 157 ms | 17.5 ms |
| 32 | Service Runner [tc~je~mngt_mode] | 256 | 405 | 3.84 MB | 9.00 kB | 1.38 s | 1.39 ms |
| 95 | Service Runner [tc~je~sca~ejb.pl] | 222 | 388 | 2.98 MB | 1.84 kB | 1.77 s | 346 us |
| 34 | Service Runner [tc~bl~accounting] | 221 | 372 | 3.06 MB | 26.9 kB | 1.22 s | 1.87 ms |
| 30 | Service Runner [memory] | 218 | 87 | 4.98 MB | 220 kB | 174 ms | 12.4 ms |

FIG. 9F

| Application | Opened | Closed | Read Bytes | Written Bytes | Read Time | Write Time | Read Operat |
|---|---|---|---|---|---|---|---|
| sap.com/tc~sec~wssec | 1,128 | 955 | 2.64 kB | 0 | 36.7 us | 0 ns | 1 |
| sap.com/com.sap.xi.md | 837 | 745 | 66.0 kB | 0 | 815 us | 0 ns | 46 |
| sap.com/tc~esi~esp~e | 800 | 777 | 2.73 kB | 0 | 89.8 us | 0 ns | 2 |
| sap.com/tc~uddi | 709 | 648 | 77.1 kB | 0 | 970 us | 0 ns | 53 |
| sap.com/com.sap.ip.bi.s | 673 | 269 | 29.2 kB | 0 | 368 us | 0 ns | 21 |
| sap.com/com.sap.portal | 669 | 263 | 21.1 kB | 0 | 244 us | 0 ns | 15 |
| sap.com/com.sap.portal | 648 | 258 | 40.1 kB | 0 | 325 us | 0 ns | 20 |
| sap.com/con.sap.ip.bi.e | 643 | 240 | 21.1 kB | 0 | 252 us | 0 ns | 15 |
| sap.com/tc~lm~ctc~cul | 642 | 623 | 454 kB | 0 | 5.61 us | 0 ns | 264 |
| sap.com/com.sap.ip.bi.t | 639 | 260 | 21.1 kB | 0 | 243 us | 0 ns | 15 |
| sap.com/com.sap.portal | 637 | 243 | 21.8 kB | 0 | 288 us | 0 ns | 17 |
| sap.com/com.sap.ip.bi. | 616 | 261 | 21.2 kB | 0 | 309 us | 0 ns | 16 |
| sap.com/caf~runtime~n | 579 | 232 | 37.3 kB | 0 | 650 us | 0 ns | 23 |
| sap.com/com.sap.portal | 569 | 244 | 21.1 kB | 0 | 243 us | 0 ns | 15 |

FIG. 9G

PROFILING INPUT / OUTPUT OPERATIONS

BACKGROUND

Software applications running in a distributed application server environment may have a plurality of concurrent users accessing the servers and applications. This can result in performance and scalability problems with the servers and applications running on the servers. Performance monitoring, profiling and debugging tools can monitor software applications running on the servers to determine resource consumption information.

Software profiling is a technique for measuring where software application programs consume resources (e.g., central processing unit (CPU) computation times, memory accesses). A profiling tool or profiler can analyze the resource consumption of an application running on a server and provide profiling data based thereon. For example, a Java profiler can support a broad set of Java virtual machines (JVMs). The Java profiler can provide comprehensive profiling of a Java application running on the JVM.

SUMMARY

Implementations of the present disclosure provide computer-implemented methods for input/output (I/O) profiling. In some implementations, a method includes executing a virtual machine configured to execute a plurality of applications and perform a plurality of I/O operations; storing meta information for a first I/O operation performed by the virtual machine in an I/O information holder for the virtual machine; receiving a request to begin an I/O profiling session on the virtual machine after storing the meta information; and reporting an I/O event record for a second I/O operation performed by the virtual machine using the meta information for the first I/O operation, wherein the second I/O operation is performed after beginning an I/O profiling session on the virtual machine.

In some implementations, the first I/O operation comprises opening a file or network connection, and wherein the second I/O operation comprises using the file or network connection opened by the first I/O operation. In some implementations, the meta information comprises: a name of a file or network connection, and a time stamp.

In some implementations, the I/O information holder comprises an array, and storing the meta information comprises storing the meta information at a position in the array based on a descriptor for a file or network connection. In some implementations, the method further includes synchronizing access to the array at the position.

In some implementations, the I/O information holder comprises a hash table, and storing the meta information comprises storing the meta information in the hash table using a descriptor for a file or network connection to determine a hash table key. In some implementations, the method further includes synchronizing access to the hash table.

In some implementations, the I/O information holder comprises an array and an overflow hash table, and storing the meta information comprises determining that a descriptor for a file or network connection has a value greater than a size of the array and storing the meta information in the overflow hash table.

In some implementations, first I/O operation comprises opening an archive file, and the second I/O operation comprises performing an I/O operation on a sub-file within the archive file, and reporting the I/O event record comprises reporting an archive I/O event record for the archive file and a sub-file I/O event record for the sub-file.

In some implementations, reporting the I/O event record comprises combining the I/O event record with method parameter trace data. In some implementations, the I/O event record includes a stack trace, a thread identifier, and an operation duration.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes at least a server including one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

Various implementations of the subject matter described in this specification can be implemented to realize one or more of the following advantages. I/O related operations performed by applications running on a virtual machine can be profiled. I/O profiling can be started on-demand (e.g., when the application to be profiled is already running) without restarting the virtual machine. I/O profiling can be provided while limiting additional runtime and memory overhead. For example, I/O profiling can be limited to only certain users, applications, sessions, or requests, so that an I/O profiling session for a user "A" has a minimal effect on the performance of other users on the same system. I/O profiling can report I/O events at a finer level of granularity than conventional profiling. I/O profiling can report I/O events for archive files and files within archive files. A profiling front-end can aggregate I/O profiling data and present the data in a convenient, user-friendly manner.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 9A-9H show screen-shots that illustrate exemplar GUIs for viewing I/O profiling data.

DETAILED DESCRIPTION

Implementations of the present disclosure are generally directed to analyzing input/output (I/O) operations of an application running on a virtual machine. I/O operations include file operations (e.g., reading and writing to a storage device) and network operations (e.g., sending and receiving data over a communication link) More specifically, implementations of the present disclosure relate to a software profiling tool that collects and stores original profiling data at a back-end, and provides information related to I/O operations for display at a front-end.

Figure 1:
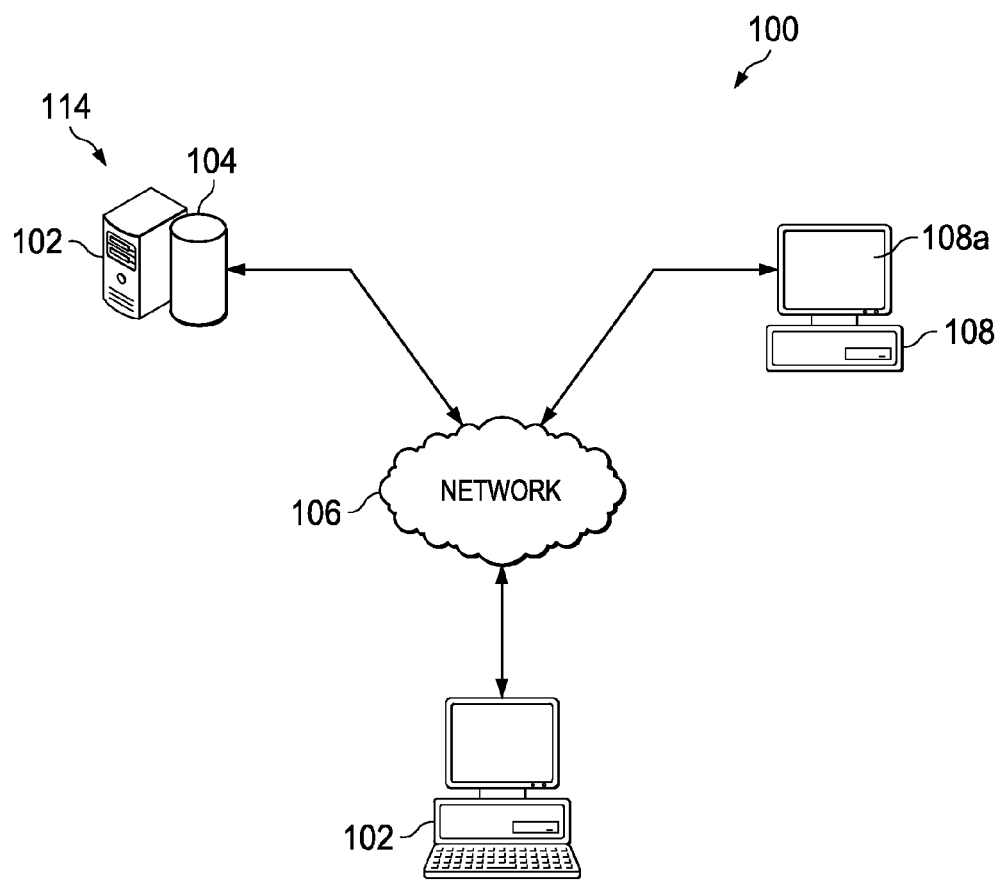
FIG. 1 is a diagram of an exemplar network architecture that can be used in accordance with implementations of the present disclosure.

Referring now to FIG. 1, a schematic illustration of an exemplar system 100 in accordance with implementations of the present disclosure can include a plurality of clients 108, 110, and a computer system 114. The computer system 114 can include a server 102 and a database 104. In some implementations, the system 100 may represent a client/server system supporting multiple computer systems (e.g., computer system 114) including one or more clients (e.g., clients 108, 110) and/or one or more servers (e.g., server 102) that are connectively coupled for communication with one another over a network 106. In some implementations, the clients (e.g., clients 108, 110) may be directly connected to the one or more servers (e.g., server 102) (without connecting by way of network 106).

The clients 108, 110 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. Each client 108, 110 may access application software on the server 102.

The server 102 can represent various forms of servers including, but not limited to a web server, an application server, a proxy server, a network server, or a server farm. For example, the server 102 can be an application server that executes software accessed by clients 108, 110. In operation, multiple clients (e.g., clients 108, 110) can communicate with the server 102 by way of network 106. In some implementations, a user can invoke applications available on the server 102 in a web browser running on a client (e.g., clients 108, 110). Each application can individually access data from one or more repository resources (e.g., database 104). For example, the server 102 can access database 104.

In some implementations, the client devices 108, 110 may communicate wirelessly through a communication interface (not shown), which may include digital signal processing circuitry where necessary. The communication interface may provide for communications under various modes or protocols, such as GSM voice calls, SMS, EMS, or MMS messaging, CDMA, TDMA, PDC, WCDMA, CDMA2000, or GPRS, among others. For example, the communication may occur through a radio-frequency transceiver (not shown). In addition, short-range communication may occur, such as using a Bluetooth, WiFi, or other such transceiver.

In some implementations, the system 100 can be a distributed client/server system that spans one or more networks such as network 106. The network 106 can be a large computer network, such as a local area network (LAN), wide area network (WAN), the Internet, a cellular network, or a combination thereof connecting any number of mobile clients, fixed clients, and servers. In some implementations, each client (e.g., clients 108, 110) can communicate with the server 102 via a virtual private network (VPN), Secure Shell (SSH) tunnel, or other secure network connection. In some implementations, the network 106 can include the Internet, a wireless service network and may include the Public Switched Telephone Network (PSTN). In other implementations, the network 106 may include a corporate network (e.g., an intranet) and one or more wireless access points.

Each client (e.g., clients 108, 110) can establish its own session with the server 102. Each session can be semi-permanent as it can be established at one point in time and torn down at another. Each session can involve two-way information exchange between the computer system 114 and each individual client 108, 110. For example, a Hypertext Transfer Protocol (HTTP) session enables the association of information with individual users. A session can be stateful where at least one of the communicating parts (e.g., the server 102 or the client (e.g., clients 108, 110)) can save information about the session history in order to be able to communicate. Alternatively, stateless communication includes independent requests with associated responses.

Multiple clients (e.g., clients 108, 110) can communicate via network 106 with the server 102. In order to run an application each client (e.g., clients 108, 110) can establish a corresponding session with the application server 102. In some implementations, a user can initiate a profiling session for an application running on the server 102 using the client 108. The client 108 can establish the profiling session with the server 102. The profiling session can profile an application running on a Java virtual machine (JVM) on the server 102. For example, a profiler, included on the server 102, can record and store profiling data for a profiling session in the database 104 for analysis by the user running the profiling session from the client 108. In some implementations, the profiling data can be stored in a file system on the server 102. The profiler can also send the profiling data to the client 108 for analysis by the user. The client 108 can display the profiling data recorded for the application running on the JVM in a graphical user interface (GUI) displayed on display device 108a on the client 108.

As used herein, the term profiling data generally refers to map data and event data. Map data can include a mapping between numeric identifiers and VM structure entities such as stack traces, thread names, classes, methods, and class loaders, for example. Event data directly relates to profiled actions occurring in a VM. Exemplar actions can include the start of threads, object allocations (e.g., for the allocation trace), method enter events, method exit events, and the actual method parameters (e.g., for the method parameter trace), sampled thread stack traces (e.g., for the performance trace), and/or garbage collection events. The map data can be referenced in the event data. Consequently, instead of writing explicit class specifications, method specifications, and complete stack traces within the event data, only the corresponding numeric identifier need be written. In this manner, the amount of event information (from a memory perspective) can be drastically reduced.

Profiling data can also refer to information related to I/O operations. In some implementations, profiling data includes, for an application running on a JVM, some or all of: how many bytes have been sent or received by the application; how much time the application has spent reading and writing I/O information; how many I/O operations the application has performed; throughput information (e.g., transferred bytes per second); average write and read time; what files are opened, closed or deleted; and which network connections are established or closed.

Figure 2:
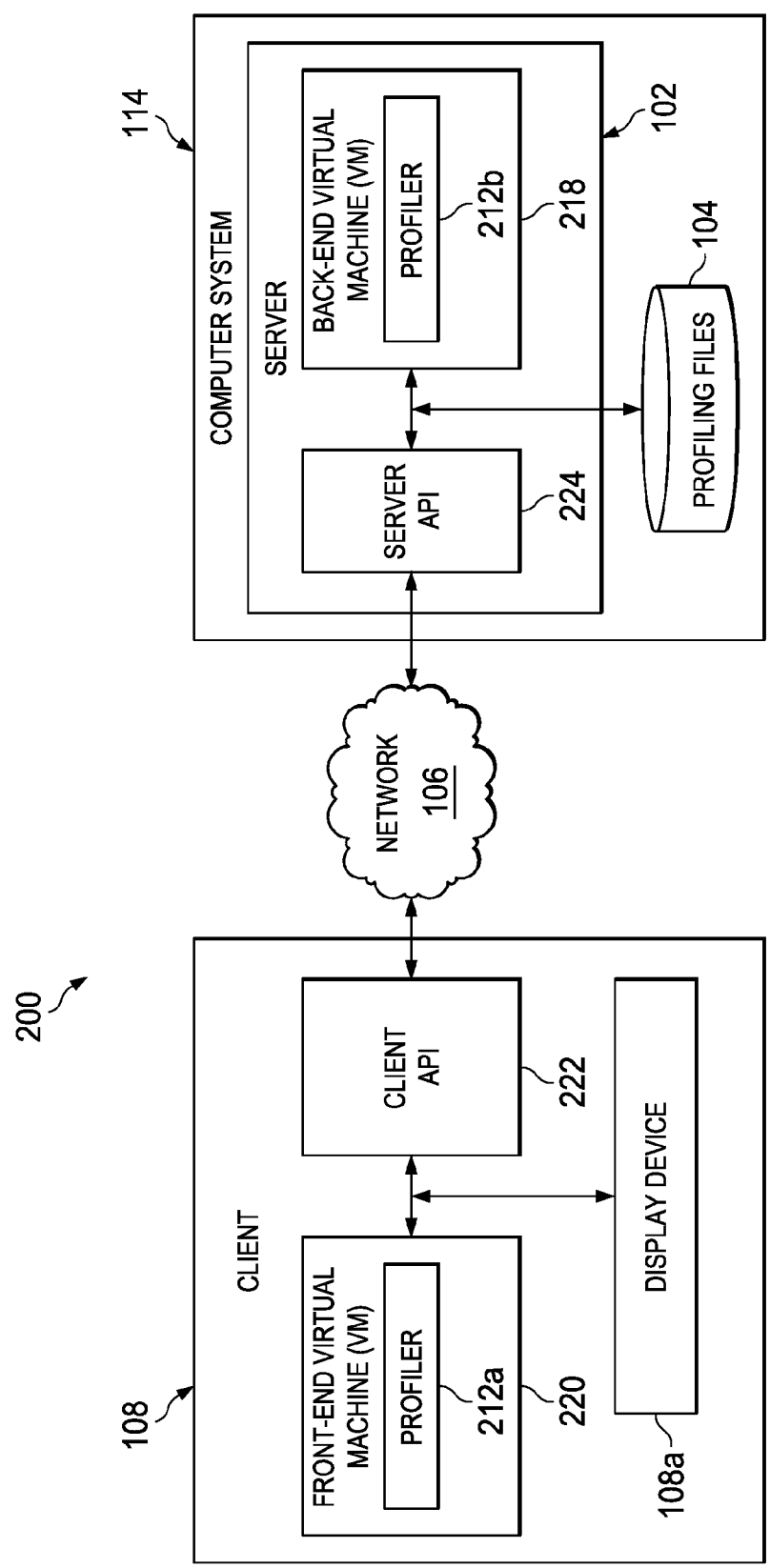
FIG. 2 is a block diagram of an exemplar system that includes a profiler.

FIG. 2 is a block diagram of an exemplar system 200 that includes a profiler. The system 200 is implemented as a client/server system, an example of which can include system 100 of FIG. 1. The exemplar system 200 can be implemented using client 108, network 106 and computer system 114 that includes server 102 and database 104.

For example, the profiler can analyze the resource consumption of an application running on a JVM. In some implementations, the application can be a standalone Java application. In some implementations, the application can be a complex enterprise application that can utilize a plurality of resources. For example, the profiler can be a JVM Profiler provided by a software provider.

The profiler can include two components: a profiler front-end component (front-end profiler 212a) and a profiler back-end component (back-end profiler 212b). The back-end profiler 212b can be integrated into a back-end virtual machine (VM) 218. In some implementations, a native application can be provided as a front-end, the native application understanding the profiling protocol of the back-end. In some implementations, the front-end profiler 212a can be integrated into a front-end VM 220. For example, the back-end VM and the front-end VM can each be a JVM provided by a software developer and/or provider. The JVM can run one or more applications integrated with the back-end profiler 212b in the back-end VM 218 and provides for connection to the front-end profiler 212a. The back-end profiler 212b can provide profiling data for one or more applications running on the back-end VM 218. The front-end profiler 212a can provide a visual representation of the profiling data provided by the back-end profiler 212b (e.g., client 108 can include front-end profiler 212a and display device 108a can display the profiling data to a user in a GUI).

For example, a back-end profiler for a JVM can expose profiling data from a Java application executing on a back-end VM. The back-end profiler can use a Java Virtual Machine Tool Interface (JVMTI) to collect profiling data from the JVM. In some implementations, the JVM can provide an interface to load the back-end profiler (e.g., as an agent) into the JVM process. In some scenarios, a proprietary implementation can directly integrate the back-end profiler into the JVM. For example, the JVM can include a proprietary back-end profiler directly integrated into the back-end VM.

In some implementations, during a profiling session, a user can directly connect to the VM that includes the profiler (e.g., back-end VM 218 that includes back-end profiler 212b). The user can interactively request profiling data be sent from the back-end profiler 212b to the front-end profiler 212a. Profilers 212a, 212b can communicate with each other using client application programming interface (API) 222 and server API 224, respectively. For example, computer system 114 can establish a socket connection between the back-end profiler 212b and front-end profiler 212a. The profilers 212a, 212b can be located on physically different machines (e.g., client 108 and server 102, respectively). The profiling data can be transferred from the back-end profiler 212b to the front-end profiler 212a (e.g., by way of a socket connection or the transfer of one or more files). The front-end profiler 212a can receive the profiling data and prepare it for analysis and display to a user. For example, the front-end profiler 212a can display the profiling data in a GUI on display device 108a. In some implementations, the profiling data can be transferred using a file transfer.

In some implementations, the computer system 114 may directly connect to client 108 without the use of network 106. In some implementations, the front-end VM 220 and back-end VM 218 including profiler 212a and profiler 212b, respectively, may run on the same machine where client 108, server 102 and database 104 are included on the same physical machine.

The front-end profiler 212a can be a stand alone application that can communicate with the back-end profiler 212b included in the back-end VM 218 without the need for a front-end VM. More specifically, a front-end profiler may be a stand-alone program or application that is compatible with a back-end profiler. In some implementations, the front-end VM 220 can run the front-end profiler stand-alone application. The front-end profiler stand-alone application can analyze additional stand-alone applications running on the front-end VM 220. The front-end profiler stand-alone application can also analyze applications running on the back-end VM 218.

In some implementations, the profilers 212a, 212b can be integral parts of VMs 220, 218, respectively. This can allow for "on-demand" examination of applications running on the back-end VM 218. Because the VMs 220, 218 include profilers 212a, 212b, respectively, profiling can occur during runtime without the need to restart the VMs 220, 218. Including a profiler in a VM reduces the memory usage typically required, thereby minimizing the memory overhead of the computer system (e.g., computer system 114).

The server API 224 can start and stop the VM included in the back-end VM 218 that includes the application for profiling. The back-end profiler 212b can record the profiling data for the application running on the back-end VM 218. In some implementations, the back-end profiler 212b can store the profiling data as one or more profiling files in the database 104. In some implementations, the back-end profiler 212b can send the profiling data to the front-end profiler 212a for further processing. For example, a JVM's debug connection can connect the client 108 to the server 102 to communicate profiling data from the back-end profiler 212b to the front-end profiler 212a using server API 224 and client API 222, respectively.

In some implementations, a developer can use a multi-language software development environment to implement, test and debug a software project. The software development environment can be an open architecture software development platform that includes an integrated development environment (IDE) and a plug-in system. The plug-in system can allow extensions to the IDE with the ability to integrate custom tools. The plug-in system can provide a framework for integrating user-made applications and infrastructure components. For example, a front-end profiler that includes a user interface can be provided as a plug-in to the software development platform. For example, the front-end profiler can be an Eclipse plug-in that can be integrated into an Eclipse platform. The Eclipse platform can provide an IDE for implementing, testing and debugging Java based software development projects. An Eclipse platform that includes a front-end profiler plug-in can additionally provide profiling of Java based software development projects. For example, the front-end profiler 212a can be a plug-in to a software development platform running on the front-end VM 220.

A remote profiling session can occur when a host or server (e.g., server 102) that includes the application for profiling is remotely located from the client (e.g., client 108) running the application that initiates the profiling session. For example, system 200 shows an exemplar remote profiling session where the back-end VM 218 is running an application that includes the back-end profiler 212b and the client 108 initiates the profiling session from the front-end VM 220, which includes front-end profiler 212a. In a remote profiling session, opening a debugging port to the back-end VM 218 can switch the back-end VM 218 into a profiling mode. Using client 108, a user can connect to the back-end VM 218 for profiling by connecting to the debugging port. As shown in FIG. 2, the back-end profiler 212b is an integral part of the back-end VM 218. As described above, this can allow the back-end VM 218 to be switched into a profiling mode "on demand" during execution of the back-end VM application without the need to restart the back-end VM application.

In some implementations, a local profiling session can occur when the application for profiling and the application that initiates the profiling session are located on the same host or server (e.g., the same physical machine). The local profiling session can perform simultaneous source code implementation, testing, debugging and profiling. The host can include a local display device that displays a GUI to a user. The GUI can allow the user the ability to control and configure the profiling session.

In some implementations, a user can perform a remote or local profiling session in an online or interactive mode. In an online profiling session, a front-end profiler (e.g., front-end profiler 212a) can initiate a profiling session with a back-end profiler (e.g., back-end profiler 212b). For example, a user interacting with a GUI displayed on display device 108a can start and stop the profiling session as well as interact with the back-end profiler 212b during the profiling session. The interaction can include configuring and controlling the profiling session as well as receiving profiling data. The user can request the resultant profiling data from the back-end profiler 212b for display on the display device 108a. The back-end profiler 212b can open a debugging port to the back-end VM 218 when the front-end profiler 212a initiates an online profiling session with the back-end profiler 212b. The back-end VM 218 can then wait for a connection. The front-end VM 220 that includes the front-end profiler 212a can connect to the debugging port using client API 222 and server API 224 by way of network 106.

In some implementations, in an online profiling session, a user may optionally store the profiling data received from the back-end VM in a local file (e.g., a file located on the client 108 as part of a local file system or repository). The user can access the locally stored profiling data file at any time after the completion of the profiling session.

In some implementations, a user can perform a remote or local profiling session in an offline or non-interactive mode. In an offline profiling session, a front-end profiler (e.g., front-end profiler 212a) can initiate a profiling session with a back-end profiler (e.g., back-end profiler 212b) but there is no interaction between the front-end profiler (e.g., front-end profiler 212a) and the back-end profiler (e.g., back-end profiler 212b) during the profiling session. For example, the system 200 can provide an interface to couple the front-end VM 220 to the back-end VM 218 using the server API 224 in order to start and stop the profiling session. The back-end VM 218 that includes the back-end profiler 212b can store the profiling data in the database 104, and/or a file. For example, a user interacting with a GUI displayed on the display device 108a can start and stop the profiling session. Once complete, the user can request the profiling data stored in the file in the database 104 from the computer system 114 (e.g., the user can interact with a GUI displayed on display device 108a to initiate the request). The client 108 can receive the profiling data file and display its contents to the user on display device 108a.

In an offline profiling session, storing profiling data for the profiling session in a profiling file on database 104 can enable a user to retrieve profiling data for a back-end VM (e.g., back-end VM 218) at any point after the profiling session is complete. For example, the stored profiling data can be retrieved from the database 104 whether or not the back-end VM (e.g., back-end VM 218) is running.

Figure 3:
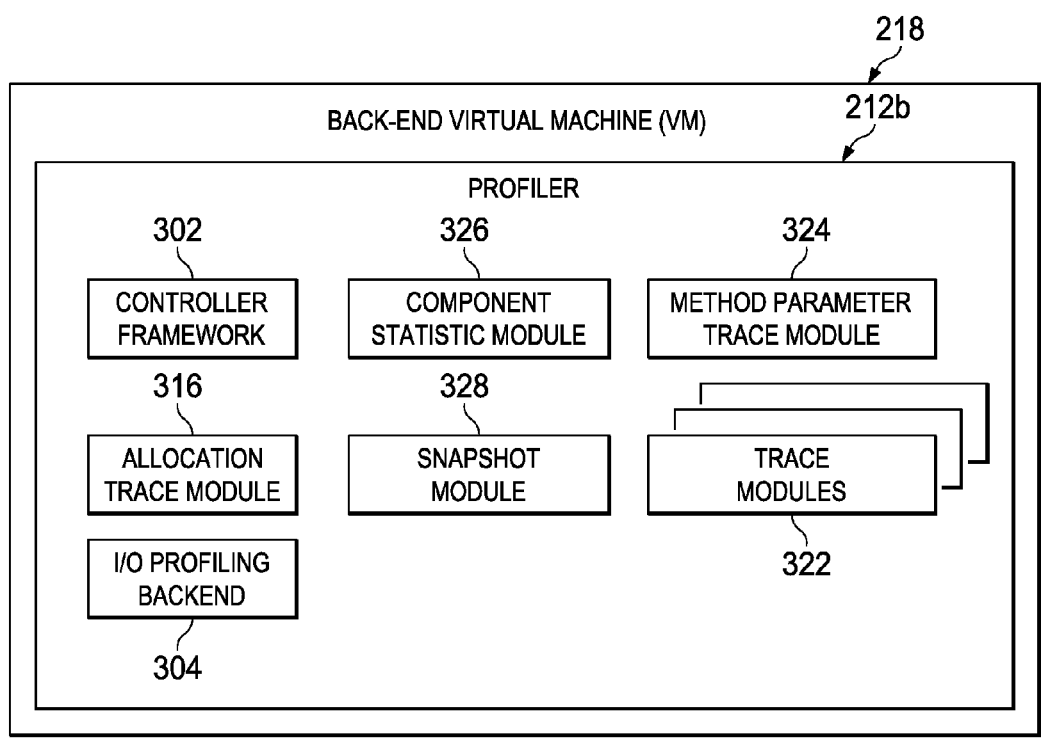
FIG. 3 is a block diagram of an exemplar profiler included in an exemplar back-end virtual machine (VM).

FIG. 3 is a block diagram of an exemplar profiler (e.g., back-end profiler 212b) included in an exemplar back-end VM (e.g., back-end VM 218). The back-end profiler 212b can include a plurality of profiler modules, filters and frameworks. The back-end profiler 212b includes an I/O profiling module 304. The back-end profiler 212b can include an allocation trace module 316, a method parameter trace module 324 and additional trace modules 322. Each profiler trace module can capture a stream of events that match the criteria of the module (e.g., an allocation trace module can record all memory allocation events in the profiled application).

The back-end profiler 212b can include a controller framework 302. In some implementations, the controller framework 302 can start and stop profiling sessions as well as traces during a profiling session. The controller framework 302 can allow a user to select specific back-end profiler options and settings for a profiling session. For example, the front-end profiler 212a can display a GUI to the user on display device 108a that displays the options and settings for the back-end profiler 212b. The user, interacting with the GUI, can select specific back-end profiler options and settings for a profiling session.

The back-end profiler settings can include functional settings and filter settings. Functional profiler settings can determine the functional area of the application code to profile. For example, a functional profiler setting can specify the types of traces to perform for the profiling session (e.g., an allocation trace, a method parameter trace, and/or a performance trace). Filter profiler settings can define a validity scope (e.g., user, session, thread, VM, etc.) for the functional profiler setting for the profiling session. For example, referring to FIG. 2, a user, operating client 108, can start an allocation trace in the back-end profiler 212b. The validity scope of the profiling session can be for the user.

The profiler options can include specific monitoring, debugging and analysis functions. For example, profiler options can include memory debugging (e.g., memory leak detection), performance analysis (e.g., hotspot identification), synchronization monitoring, and application debugging (e.g., called method detection). By way of non-limiting example, the profiling functions can include one or more sub-functions (e.g., heap dump, time-based sampling, memory-based sampling, allocation trace, method parameter trace, garbage collection trace, etc.). Allocation analysis can identify and isolate memory related problems in an application. Allocation analysis can be used for memory debugging.

Performance analysis can monitor an application's behavior using information gathered as the application executes. Performance analysis can determine which parts of an application can be optimized for speed. In some implementations, performance analysis can indicate where within the application spent its time during execution thereof. Performance analysis can indicate which methods called other methods while the application executes.

In some implementations, a user can use the controller framework 302 to start and stop profiling sessions, and to enable profiler traces for a session. For example, the user can determine one or more profiler traces to enable during a profiling session. In a single profiling session, the user may enable an allocation trace that uses the allocation trace module 316 and a method parameter trace that uses the method parameter trace module 324.

The I/O profiling backend 304 reports I/O events, e.g., to the front-end virtual machine 220. I/O events are operations performed by the back-end virtual machine 218 or applications running on the virtual machine 218. An example of an I/O event is a file open event. The backend 304 reports a file open event when an application opens a file. The report for the file open event includes related data, for example, a timestamp, the name of the opened file, a file descriptor (for UNIX systems) or handle (for Windows systems), an identifier of a thread responsible for opening the file, and stack trace information (e.g., indicating what methods are responsible for opening the file). Another example of an I/O event is a file close event. A report for a file close event typically includes similar information as was included for a file open event.

Another example of an I/O event is file read event. The backend 304 reports a file read event when an application reads data from a file. The report for the file read event includes, for example, the number of read bytes, the read duration (how long it takes to read the data), the file descriptor or handle, an identifier of the thread responsible for reading the data, and stack trace information (e.g., indicating what methods are responsible for reading the data). Other examples of I/O events are file write events and file delete events. Reports for those events typically include similar information.

The backend 304 can report network related I/O events. Examples of network related I/O events include connection open events, data receive and send events, and connection close events. Reports for these events include related information, for example, network addresses (e.g., Internet Protocol addresses), number of bytes sent or received, an identifier of a thread responsible for sending or receiving, and stack trace information.

I/O profiling can provide an overview of I/O operations performed and I/O resources used by methods in an application. Analysis of the I/O profiling data can identify I/O operations that transmit or receive an excessive amount of data. The analysis of the I/O trace data can identify I/O operations that consume an excessive number of CPU resources. The analysis of the I/O trace data can identify methods that perform an excessive number of I/O operations. The analysis of the I/O trace data can identify applications that are suspended for an excessive amount of time due to waiting on I/O operations. For example, where an operating system suspends execution of an application while executing I/O operations, the application may be suspended for an excessive amount of time while waiting for the operating system to execute I/O operations.

A method parameter trace module 324 can trace the values of method parameters. For example, a method parameter trace can check if specific parameter values used in a method lead to excessively long execution times for the method. Additionally, a method parameter trace can provide an overview of the parameter values used by the method during the execution of the application in a profiling session.

A component statistic module 326 can group one or more consecutive methods in a stack trace into a component. A component can be a specific application programming interface (API) used by the application. Examples of components can be Java components that can include, but are not limited to, a persistence API, a security API, a portal API and a servlet API. The methods in the stack trace can be grouped into components based on a defined "entry method" for the component. The component statistic module 326 can then categorize the trace data at the stack level. The stack trace including methods can be grouped into components, where one or more consecutive methods can be placed into one component group. Each component group can provide allocation statistics for the API associated with the component.

Profiling data can be subdivided into snapshots. A snapshot refers to data for a timeframe or interval where profiling data was collected. For example, a user can create a snapshot by selecting a corresponding entry within a context menu of a profiling trace entry in a profile view. As another example, the profiling data can be read at the front-end (e.g., after finishing a dialog step) and the user can input a command to create a snapshot. In response, the front-end can send a command to the back-end to create a snapshot of the profiling data. Consequently, the back-end inserts a snapshot marker into the original profiling data. In the case where the user would like to create a sub-snapshot (e.g., a snapshot within a snapshot), or the user would like to create a snapshot from an arbitrary time period, the front-end can identify the corresponding sections, or sub-regions in the original profiling data, and can read the profiling data for that section.

Referring to FIGS. 1 and 2, the client 108 can provide a GUI to a user for display on display device 108a that can allow the user to start, stop and control profiling sessions in the back-end profiler 212b using the client API 222 in communication with the server API 224 by way of network 106. Additionally, the server API 224 can provide the client API 222 by way of network 106 profiling data to display to the user in a GUI on the display device 108a. The user can access and evaluate the displayed profiling data. In some implementations, a guided mode can identify problem areas indicated by the profiling data. In some implementations, the profiling data can be stored as a profiling file in the database 104 in the computer system 114. In some implementations, the profiling data can be stored as a file in a file system included on the client 108. Storing of the profiling data can allow for subsequent retrieval and analysis.

The client 108 and the client 110 can connect to the computer system 114 by way of the network 106. In some implementations, the back-end profiler 212b can perform in compliance with both the client 108 and the client 110, simultaneously, while remaining multiple client compliant. The back-end profiler 212b can restrict profiling sessions to particular clients, while the server 102 can assign the current client information to its respective thread.

Figure 4:
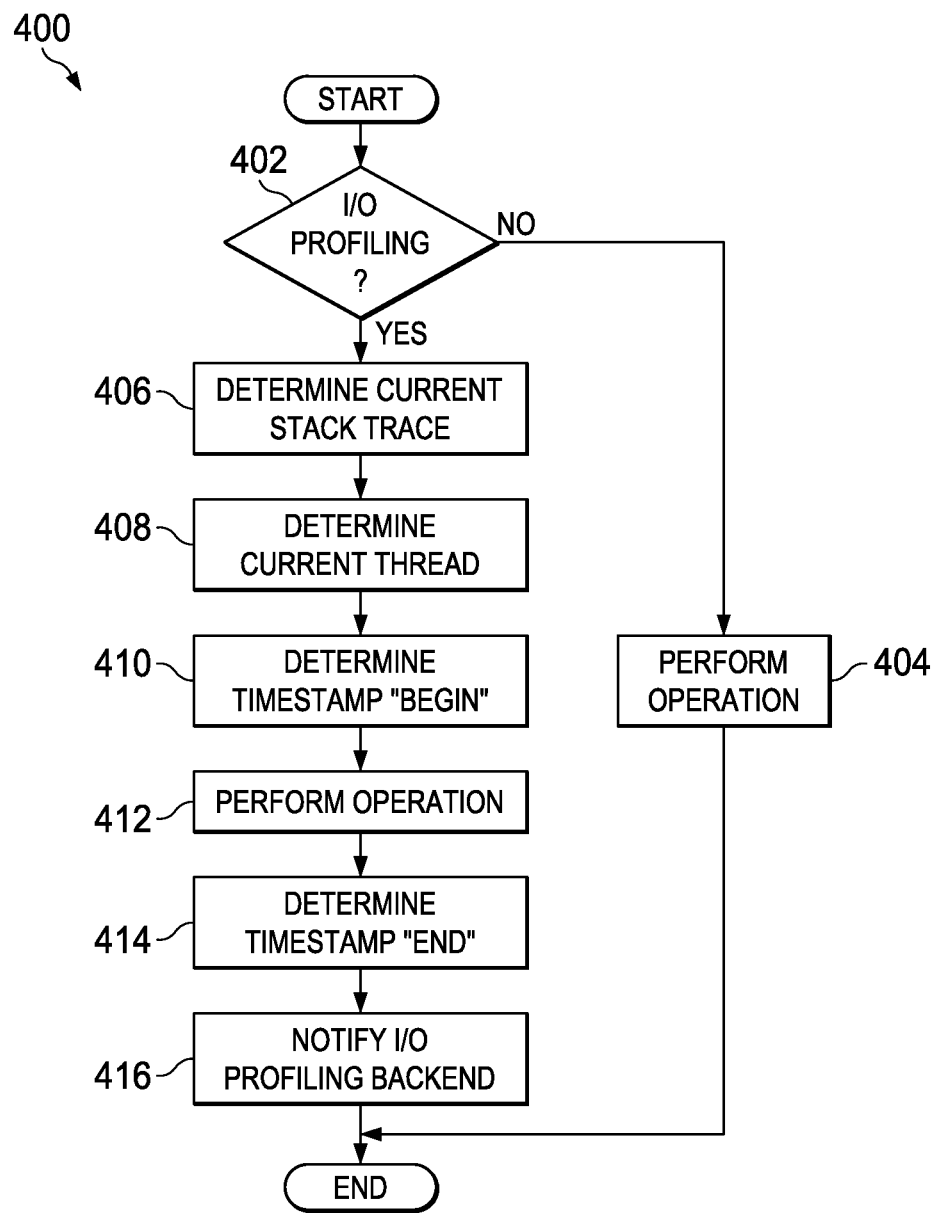
FIG. 4 is a flowchart illustrating exemplar steps that can be executed by a system to generate an I/O profiling event record for an I/O operation.

FIG. 4 is a flowchart illustrating exemplar steps 400 that can be executed by a system to generate an I/O profiling event record for an I/O operation. The system may be, for example, the back-end virtual machine 218 of FIG. 2 executing an application. The steps 400 are performed in response to the application calling an I/O related function to perform the operation. For example, the Java Standard APIs include various functions related to I/O, including java.io.FileInputSteam, java.io.FileoutputStream, java.io.RandomAccessFile, and java.nio. For convenience, the steps 400 will be described with respect to a system that performs the steps.

In step 402, the system determines whether I/O profiling is active. Typically the system determines whether I/O profiling is active using a profiling backend, e.g., the profiler 212b of FIG. 3. The profiler 212b receives request to stop and start profiling, including I/O profiling. The system can send a request to the profiler 212b and receives an indication of whether I/O profiling is active. If I/O profiling is not active, the system performs the I/O operation in step 404. The system can perform the operation, for example, using instructions for the operation from the Java Development Kit. If I/O profiling is active, the system performs steps 406-416.

In step 406, the system determines the current stack trace. The stack trace can be determined using, for example, coding inside the virtual machine that allows for walking the complete Java stack trace. In step 408, the system determines a current thread. The current thread is the executing thread performing the I/O operation. Various techniques for determining the current thread are possible. In step 410, the system determines a timestamp for the beginning of the I/O operation. The timestamp can be labeled, e.g., "begin." In step 412, the system performs the I/O operation. The system can perform the operation, for example, using instructions for the operation from the Java Development Kit. In step 414, the system determines a timestamp for the end of the I/O operation. The timestamp can be labeled, e.g., "end."

In step 416, the system notifies an I/O profiling backend, e.g., the I/O profiling backend 304 of FIG. 3. The backend reports the determined information (the current stack trace, the current thread, "begin" and "end" timestamps and/or a read duration based on the difference between the timestamps). For example, the backend may write the information to a file, or provide the information to a front end profiler.

In some implementations, the steps 400 are implemented by extending method implementations specified by Java Standard APIs (or other standardized methods). For example, for a Java application that reads data from a file via the java.io.FileInputStream.read( ) method, the method can be extended to include the steps 400. Extending methods in this manner allows a user to profile I/O operations related to an application and exclude I/O events related to the internal virtual machine implementation. For example, a virtual machine may be configured to provide monitoring or logging information when executing applications, and a user profiling an application running on the virtual machine may not want to capture the corresponding I/O operations of the virtual machine.

Figure 5:
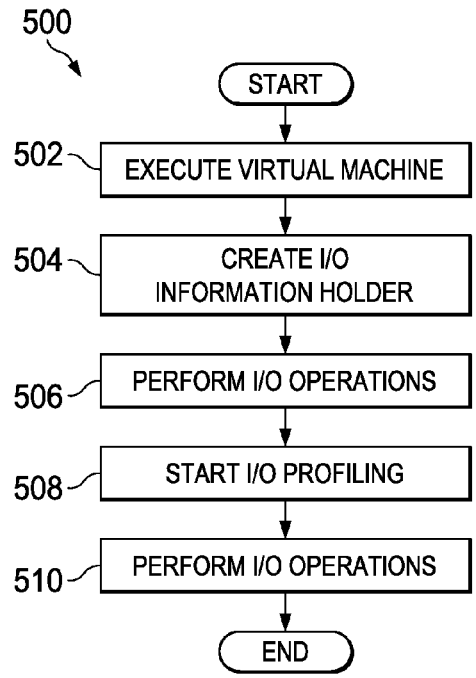
FIG. 5 is a flowchart illustrating exemplar steps that can be executed by a system to provide on-demand I/O profiling.

FIG. 5 is a flowchart illustrating exemplar steps 500 that can be executed by a system to provide on-demand I/O profiling. For convenience, the steps 500 will be described with respect to a system that performs the steps. The system may be, for example, the server 102 of FIG. 1.

In step 502, the system executes a virtual machine, e.g., a Java virtual machine. The virtual machine is configured to execute applications.

In step 504, the system creates an I/O information holder. In some implementations, the I/O information holder is an array. The array can have a fixed size, e.g., of 32,768 elements, or the array can have a flexible size. The size can be specified as a virtual machine start-up parameter. In some other implementations, the I/O information holder is a hash table. Various data structures are possible for the I/O information holder. In some implementations, the system allocates two or more I/O information holders (e.g., one for network connections, and one for opened files).

The I/O information holder stores meta information for I/O events. The I/O information holder can store meta information regardless of whether I/O profiling is active. Typically, the system stores meta information in the I/O information holder when the system performs an I/O operation involving a new file, network connection, or the like. For example, for a file open operation or a network connection open operation, the system may store meta information related to the file or the network connection in the I/O information holder. The meta information generally includes basic information, e.g., a file descriptor or socket descriptor, and additional information, e.g., a file name, an "open" timestamp, stack track information, and so on.

In step 506, the system performs I/O operations. In general, the system executes applications that run on the virtual machine, and the applications perform I/O operations. Even though I/O profiling has not started for the virtual machine, the system stores meta information for opened files and network connections in the I/O information holder. The system stores the meta information differently depending on the structure of the I/O information holder.

In some implementations, where the I/O information holder is an array, the system uses descriptors, e.g., file descriptors or network connection descriptors, as indexes to the array. A file descriptor is a value used to identify a file. A network connection descriptor is a value used to identify a network connection. The value of a descriptor can be stored in a "long" variable, e.g., as it is on some Windows systems, or a plain 32 bit value, e.g., as it is on some Unix systems. In various systems, the values of descriptors generally have values in the range from 1-32768. The descriptors typically are reused when a file or network connection is closed. If the value of a descriptor is greater than the size of the array, the system can increase the size of the array or, alternatively, use a hash table as a fallback mechanism. Using a hash table is described in the next paragraph.

Figure 6:
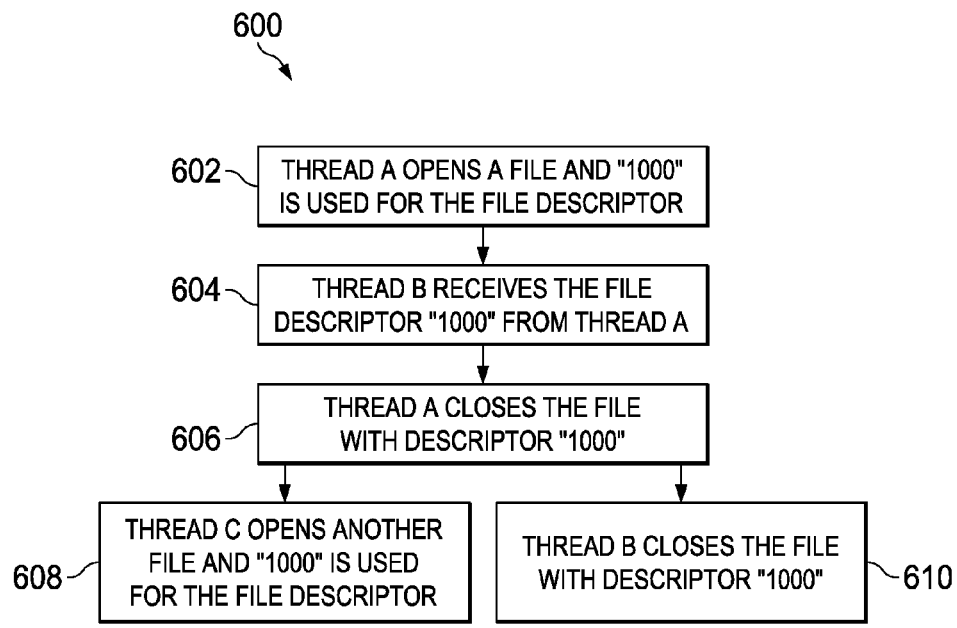
FIG. 6 is a flowchart illustrating exemplar steps that cause contention at an array position of an I/O information holder.

In implementations where the I/O information holder is an array, the system optionally synchronizes accesses to particular array positions (rather than the entire array). For example, the Java Standard I/O API allows for exchanging file descriptors between threads. In that case, the system can synchronize access to array positions to prevent contention. For example, the system may use an atomic-compare-and-swap procedure to synchronize array accesses. An example contention scenario is illustrated in FIG. 6 which is described below.

In some implementations, where the I/O information holder is a hash table, the system uses a descriptor or handle as a key for the hash table. Various hash tables and keying techniques are possible. For each opened file or network connection, the system creates a new hash entry. When the file or network connection is closed, the system removes the entry from the hash table. In some of these implementations, different threads can open and close files and network connections concurrently. To prevent collisions in accessing the hash table, the system can synchronize accesses to the hash table. Synchronization can, in some cases, decrease runtime performance, e.g., where file and network operations are serialized.

In step 508, the system begins I/O profiling. During I/O profiling, the system records I/O event records for I/O operations, e.g., as described above with reference to FIG. 4. In step 510, the system performs I/O operations and generates I/O event records. In some implementations, the system performs I/O profiling only for specified users, applications, sessions, or requests to reduce consumption of computing resources.

In some implementation, the system stores I/O event records in the I/O information holder. The system can then expose the information in the I/O information holder to a front-end profiler (e.g., the front-end profiler 212a of FIG. 2). For example, the system may write the information in the I/O information holder to a file that is available to the front-end profiler.

Because the system stored meta information for opened files and network connections in step 506, before profiling was started, I/O event records for operations that occur after profiling starts can be accounted to corresponding files and network connections that were open before profiling started. The meta information for those files and network connections can be used to provide additional detail for the I/O event records. Thus, I/O profiling can be "on-demand" so that I/O profiling can begin after the virtual machine starts and still capture meta information regarding I/O operations for files and network connections that were opened prior to starting I/O profiling.

FIG. 6 is a flowchart illustrating exemplar steps 600 that cause contention at an array position of an I/O information holder. For convenience, the steps 600 will be described with respect to a system that performs the steps. The system may be, for example, the server 102 of FIG. 1. The system performs I/O profiling as described above with reference to FIG. 5 and uses an array for an I/O information holder and uses descriptors as indexes to the array.

In step 602, the system executes a thread, Thread A. Thread A opens a file and the system assigns the value "1000" to the file as a file descriptor. In step 604, the system executes another thread, Thread B. Thread B receives the file descriptor "1000" from Thread A. This is possible, for example, where the system is using the Java Standard I/O API. In step 606, Thread A closes the file with the descriptor "1000." After closing the file, the system may reuse the file descriptor "1000" even though Thread B still has a reference to the file descriptor "1000" and may not have been notified that the file has been closed.

The system performs steps 608 and 610 in parallel (e.g., using two processors or computers, or using a single processor executing multiple threads). In step 608, the system executes a thread, Thread C. Thread C opens another file and the system assigns the value "1000" the file as a file descriptor. In step 610, Thread B attempts to close the original file using the file descriptor "1000."

Because the system uses descriptors as indexes to the array for the I/O information holder, there is contention at array position "1000." To avoid a system crash, the system synchronizes access to individual positions within the array. The system can synchronize accesses to the array, for example, using atomic-compare-and-swap processes. Some synchronization processes are supported directly by a processor and can be used without consuming large amounts of additional processing time.

Figure 7:
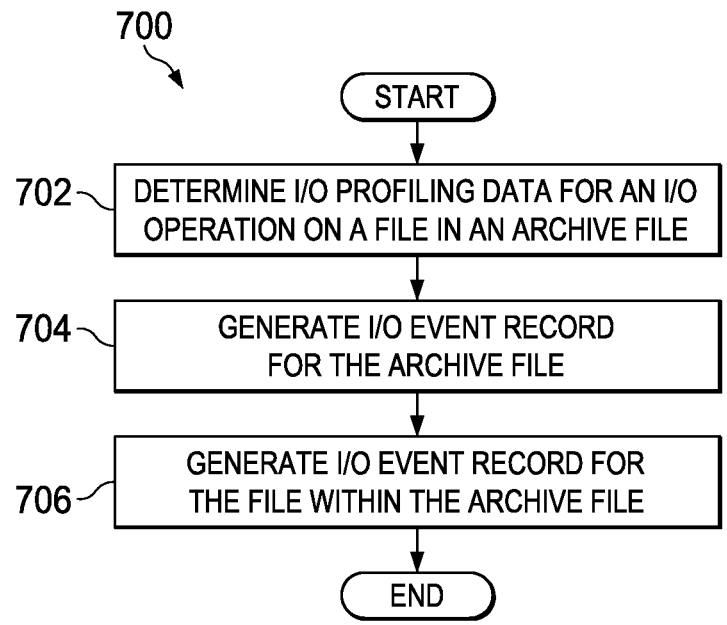
FIG. 7 is a flowchart illustrating exemplar steps that can be executed by a system to generate an I/O profiling event record for an I/O operation on an archive file.

FIG. 7 is a flowchart illustrating exemplar steps 700 that can be executed by a system to generate an I/O profiling event record for an I/O operation on an archive file. The system may be, for example, the back-end virtual machine 218 of FIG. 2 executing an application. The steps 700 are performed in response to the application calling an I/O related function to perform the operation. For convenience, the steps 700 will be described with respect to a system that performs the steps.

In step 702, the system determines I/O profiling data for the I/O operation. The I/O operation is, for example, a file open, close, read, or write operation. The I/O profiling data is, for example, a timestamp, a thread ID for a responsible thread, and other data as described above with reference to FIG. 5.

The operation is performed on an archive file. An archive file is, for example, a zip file or a jar archive. The archive file can include one or more sub-files within the archive file. For example, Java classes are typically loaded from a jar archive including many Java classes.

In step 704, the system generates an I/O event record for the archive file. The event record includes at least some of the I/O profiling data determined in step 702. The event record is associated with the archive file.

In step 706, the system generates an I/O event record for a sub-file within the archive file. The event record includes at least some of the I/O profiling data determined in step 702. The event record is associated with the sub-file within the archive file.

By creating event records for both the archive file and the sub-file, the system has I/O profiling data for both the archive file and the sub-file. For example, a system executing the steps 700 can determine how long it takes to read a certain Java class from an archive or what classes are read from an archive.

In some implementations, the system maintains a cache for opened archive files. Thus, if an archive file is opened by a certain thread, the file descriptor for the archive file is cached. So when a second thread opens the same archive file, the cached file descriptor is returned and a reference count number is incremented. When the zip file is actually closed, the reference count is decremented and the archive file remains open. If the reference count is zero, then the zip file is closed.

In some implementations, the file descriptor of the opened archive file is used to index an I/O information holder. The meta information in the I/O information holder for an archive file includes information about the opened sub-files of the archive file. For example, suppose the system reads a class "B" within a Java archive "A". The archive "A" is opened. A file descriptor "100" is created. Within the meta information of the I/O information holder for index "100", the information about the opened class "B" is maintained in addition to the name of archive. If a second class "C" is read within the same archive "A", the meta information of index "100" is extended with the information about the opened class "C". When the entry for class "C" is closed, the corresponding information within the meta information is deleted. In some implementations, when the last entry within the meta information is removed, the complete information for the archive file is removed.

Figure 8:
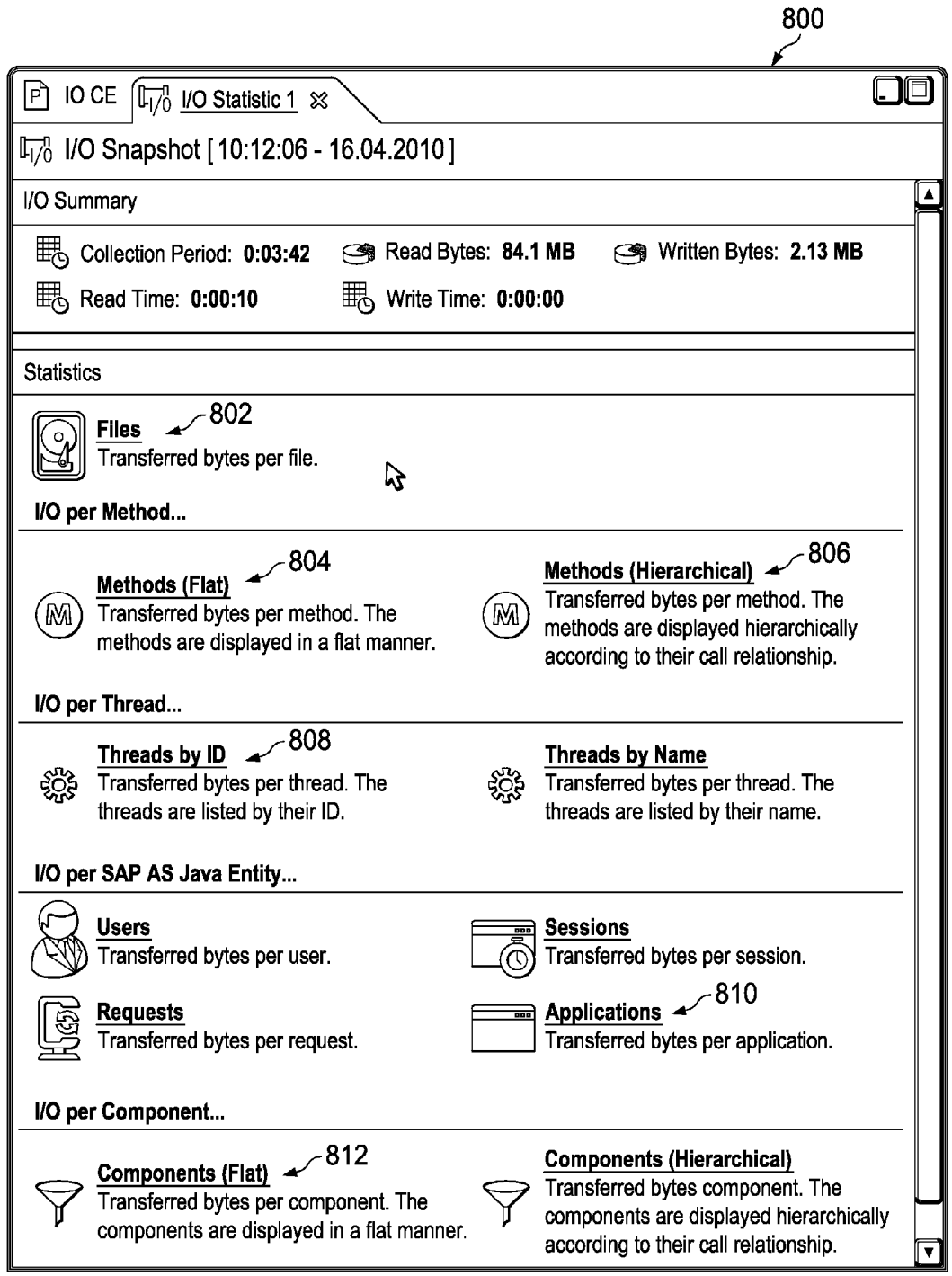
FIG. 8 shows a screen-shot that illustrates an exemplar GUI for a profiling front-end.

FIG. 8 shows a screen-shot 800 that illustrates an exemplar GUI for a profiling front-end (e.g., the profiler 212a of FIG. 2). The profiling front-end aggregates I/O profiling data (e.g., I/O event records) and presents the data for analysis. I/O profiling data can be analyzed for distinct periods of time. A display of I/O profiling data for a certain period of time can be referred to as a "snapshot."

The GUI shown in FIG. 8 provides several entry points for a user to analyze I/O profiling data. An entry point is a GUI element that a user can select to see a certain display of I/O profiling data.

For example, consider the GUI elements 802-812 in FIG. 8. When a user selects the "Files" icon 802, the profiling front-end displays a GUI for analyzing I/O profiling data by file names or descriptors (e.g., as shown in FIGS. 9A and 9B). When a user selects the "Methods (Flat)" icon 804, the profiling front-end displays a GUI for analyzing I/O profiling data by method where the methods are display in a flat manner (e.g., as shown in FIG. 9D). When a user selects the "Methods (Hierarchical)" icon 806, the profiling front-end displays a GUI for analyzing I/O profiling data by methods in a hierarchy according to their call relationship (e.g., as shown in FIG. 9E). When a user selects the "Threads by ID" icon 808, the profiling front-end displays a GUI for analyzing I/O profiling data by threads as listed by thread IDs (e.g., as shown in FIG. 9F). When a user selects the "Applications" icon 810, the profiling front-end displays a GUI for analyzing I/O profiling data by application (e.g., as shown in FIG. 9G). When a user selects the "Components (Flat)" icon 812, the profiling front-end displays a GUI for analyzing I/O profiling data by component (e.g., as shown in FIG. 9H).

Although the screen-shot 800 of FIG. 8 shows entry points for analysis of file-related I/O operations, other GUIs can show entry points for analysis of network-related I/O operations, or combinations of network and file related I/O operations.

FIG. 9A shows a screen-shot 900 that illustrates an exemplar GUI for viewing I/O profiling data by file names or descriptors in a flat manner. The GUI displays an overview of all files on which I/O operations are performed. The GUI displays, for example, the following information for a file: the number of times the file was opened, the number of times the file was closed, the number of bytes being read from the file, the number of bytes written to the file, the time spent in reading bytes from the file, the time spent in writing bytes to the file, the number of read operations, the number of write operations, the read throughput in bytes per second, the write throughput in bytes per second, the average read duration per operation, and the average write duration per operation.

FIG. 9B shows a screen-shot 902 that illustrates an exemplar GUI for viewing I/O profiling data for a particular file. The GUI displays, for example, the following information: basic read/write information (e.g., as described above with reference to FIG. 9A), a time stamp for when the file was opened, a time stamp for when the file was closed, the name and the thread identifier of a thread responsible for opening the file, and the name and the thread identifier of a thread responsible for closing the file.

Figure 9C:
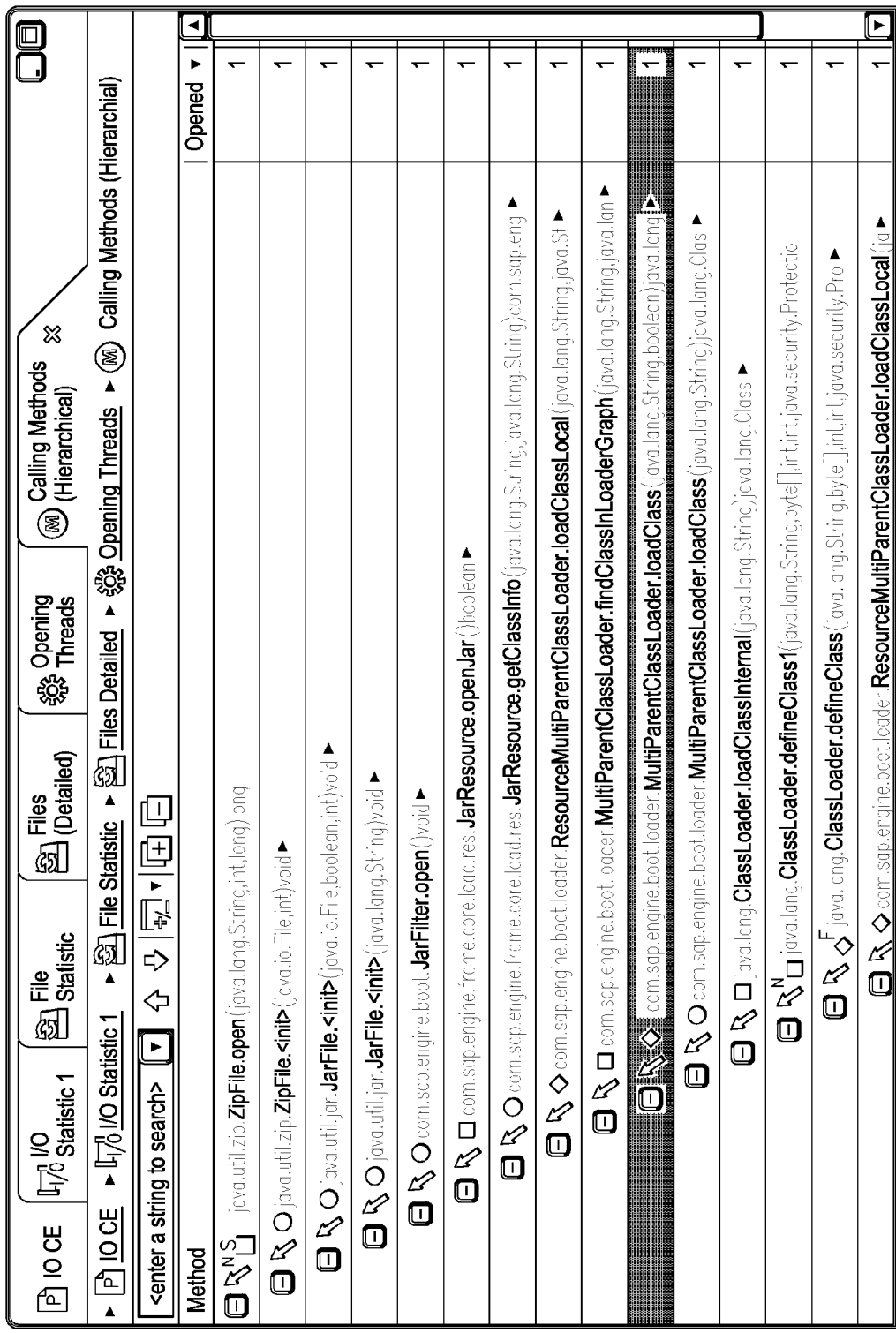
Figure 9D:
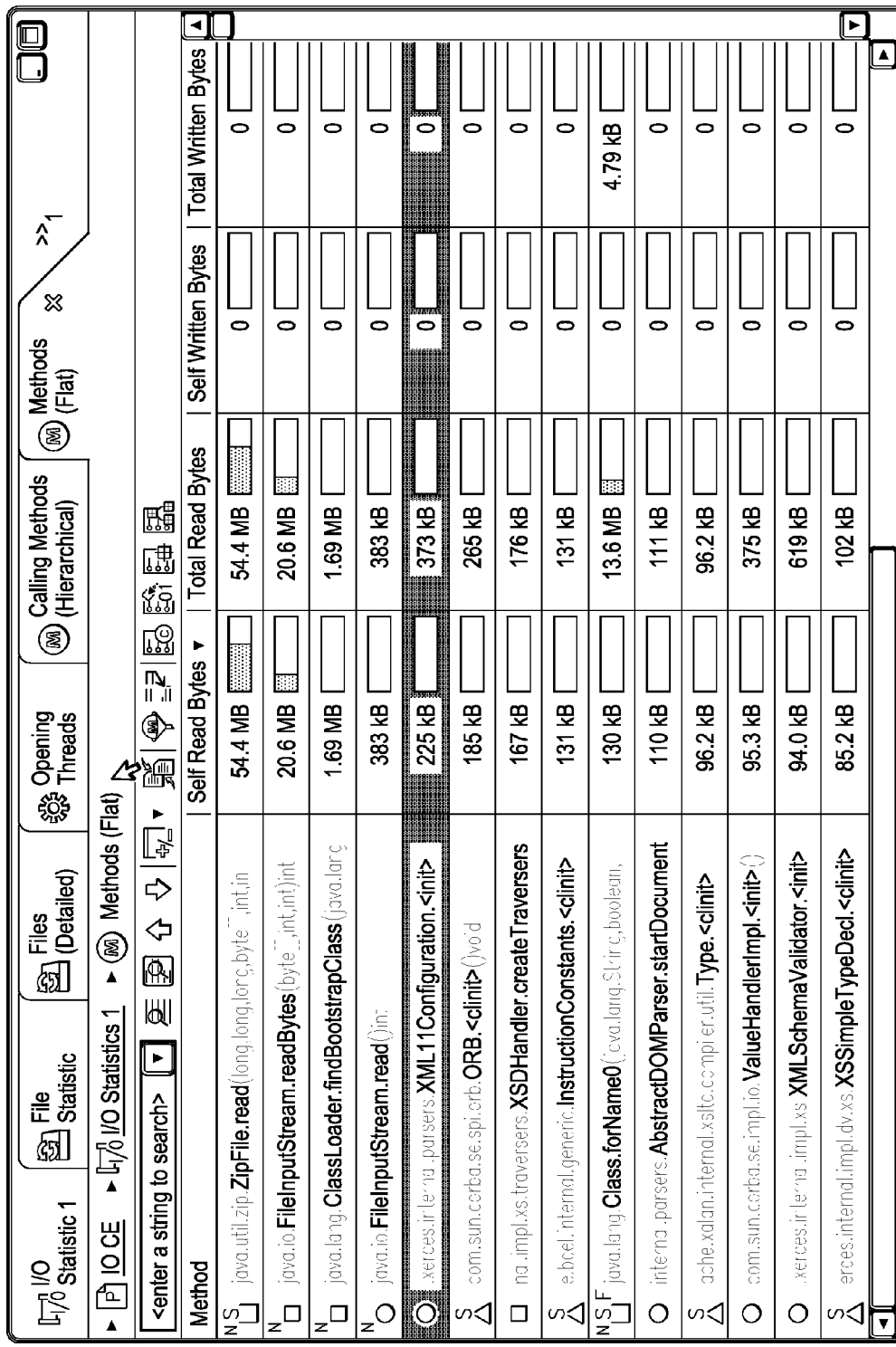
Figure 9H:
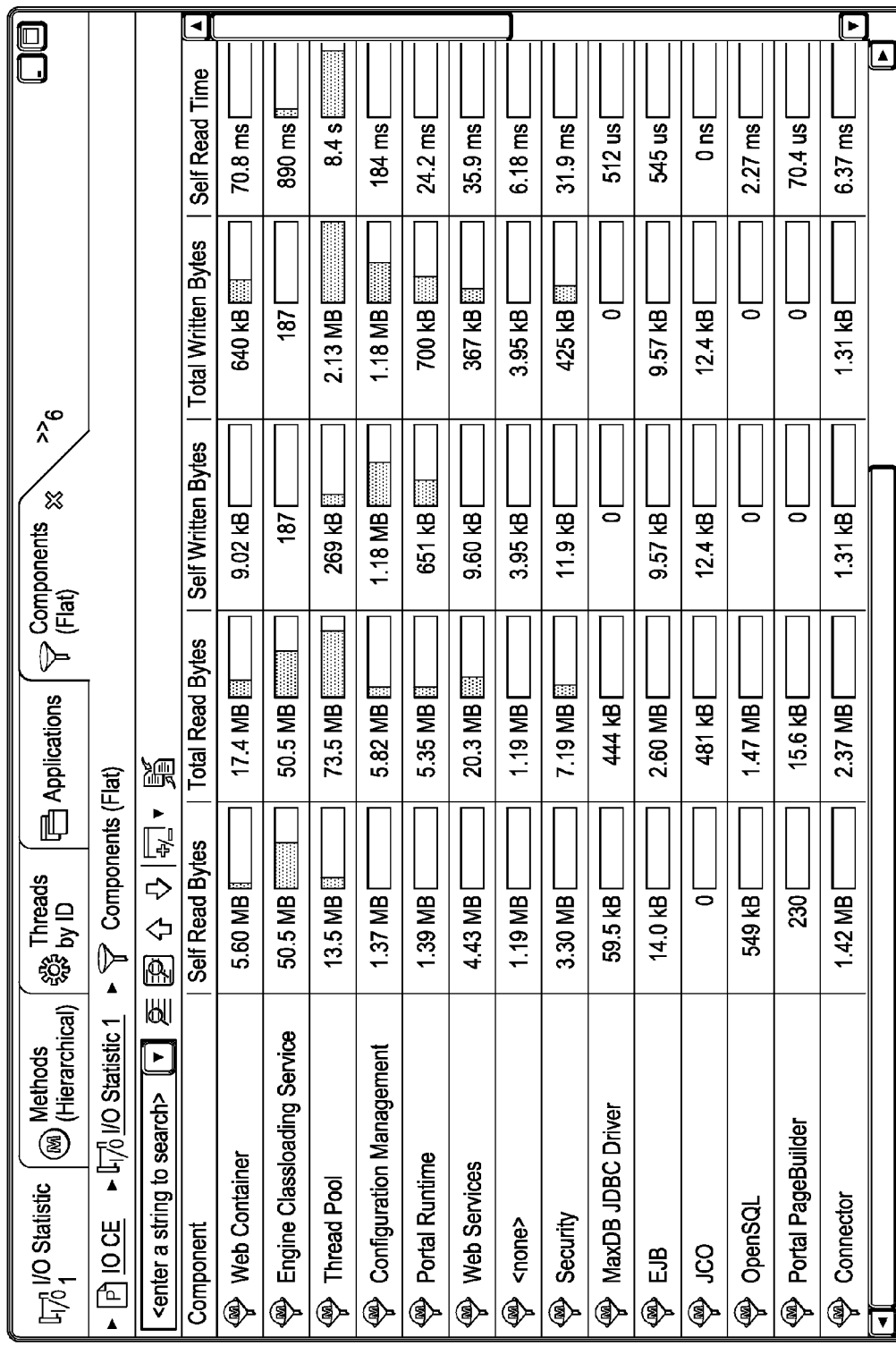

FIG. 9C shows a screen-shot 904 that illustrates an exemplar GUI for viewing the call stack of a thread that has performed an I/O operation, e.g., opening or closing a file or a network connection. The GUI can assist a user is determining where a file or network connection gets opened or closed within source code.

FIG. 9D shows a screen-shot 906 that illustrates an exemplar GUI for viewing I/O profiling data by methods. The GUI shows, for example, for each of one or more methods, the following information: how much time is spent within the method for performing I/O operations, how much time is spent within the method and other methods calling the method for performing I/O operations, how many bytes are read or written within the method, and how many bytes are read or written with the method and other methods call the method.

FIG. 9E shows a screen-shot 908 that illustrates an exemplar GUI for viewing I/O profiling data by methods in a hierarchical view. The GUI shows methods according to their call relationships. The GUI shows, for example, the information described above with reference to FIG. 9D.

In some implementations, a user can select methods from the GUIs of FIGS. 9D and 9E and view files or network connections that the methods used in performing I/O operations. The user can then select the files or network connections for viewing in a different GUI, e.g., one of the GUIs of FIGS. 9A and 9B.

FIG. 9F shows a screen-shot 910 that illustrates an exemplar GUI for viewing I/O profiling data according to threads. Each thread is identified by a thread ID and the GUI shows, for example, aggregated data on I/O operations performed by each thread. FIG. 9G shows a screen-shot 912 that illustrates an exemplar GUI for viewing I/O profiling data aggregated by applications. For example, the GUI may show I/O profiling data organized by the triplet (user, session, request). FIG. 9H shows a screen-shot 914 that illustrates an exemplar GUI for viewing I/O profiling data organized by defined component. The GUI shows, for example, aggregated I/O operations for each component.

In some implementations, a user can navigate between any of the GUIs of FIGS. 9A-9H without returning to a menu GUI (e.g., the GUI of FIG. 8). For example, the user can start viewing I/O profiling data organized by thread ID, and then select a number of threads and view I/O profiling data for methods executed by those threads or files opened by those threads.

Figure 10:
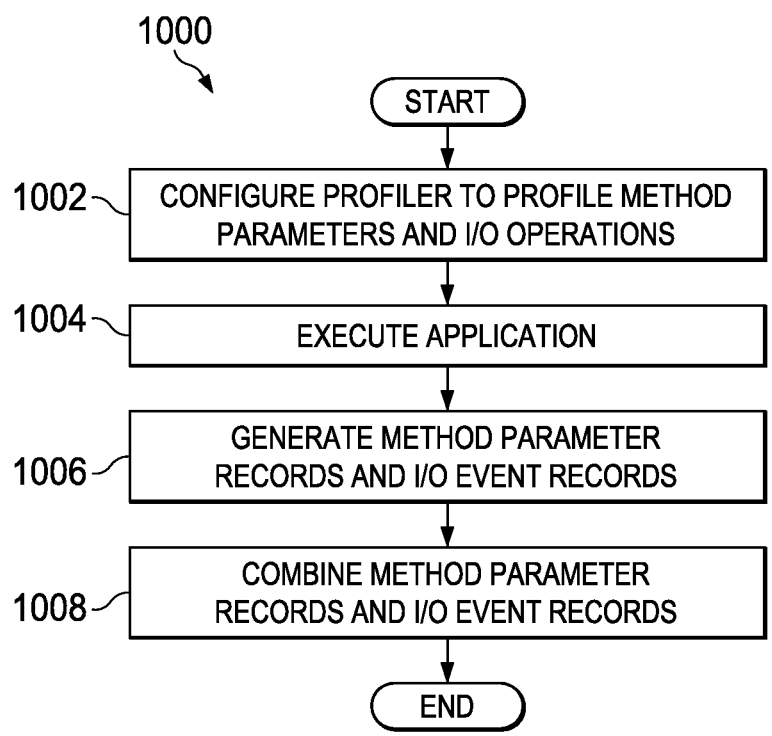
FIG. 10 is a flowchart illustrating exemplar steps that can be executed by a system to combine I/O profiling data with method parameter trace data.

FIG. 10 is a flowchart illustrating exemplar steps 1000 that can be executed by a system to combine I/O profiling data with method parameter trace data. The system may be, for example, the back-end virtual machine 218 of FIG. 2 executing an application. For convenience, the steps 1000 will be described with respect to a system that performs the steps.

In step 1002, the system configures a profiler to profile one or more method parameters and I/O operations of an application executed on a virtual machine. For example, the profiler may be the back-end profiler 212b of FIG. 2. The profiler can execute the method parameter trace module 324 of FIG. 3. The profiler determines the values of various parameters passed to a method.

In step 1004, the system executes the application. For example, the virtual machine (e.g., the back-end virtual machine 218 of FIG. 2) may execute the application that calls methods that are being profiled.

In step 1006, the system generates method parameter records and I/O event records. The method parameter records specify the values of method parameters at particular times, for example, when a method is called. The I/O event records specify I/O profiling data for I/O operations.

In step 1008, the system combines the method parameter records with the I/O event records. The system can determine, for example, the value of a method parameter when a file was opened, or the value of a method parameter when network data was received.

Consider an example involving database operations. The application calls a method executeSqlStatement(String sqlStatement). The method executes the specified SQL statement (e.g., "Select*FROM Book Where Price>100.0" or "INSERT INTO My_table (field1, field2, field3) VALUES ('test', 'N', NULL)") using a certain database. By combining method parameter profiling with I/O profiling, the system can evaluate SQL queries in great detail. For example, the following types of information may be available: how many I/O operations occur on a database table "A," how many I/O operations occur on a database table "B," how much time is spent inserting data into database table "A" compared to how much time is spent inserting data into database table "B," and that database table "B" is only read and not written to by the method.

Figure 11:
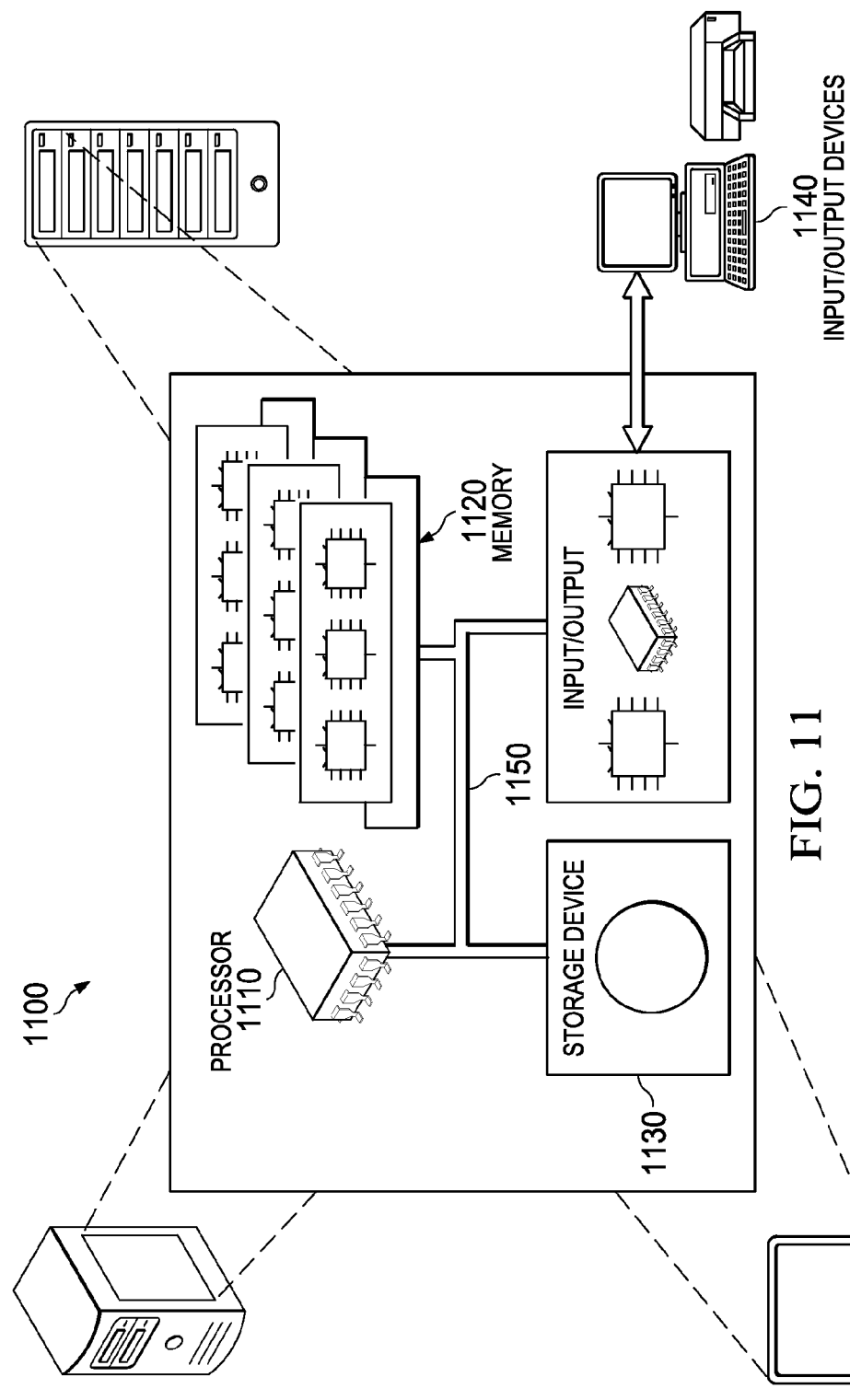
FIG. 11 is a schematic illustration of exemplar computer systems that can be used to execute implementations of the present disclosure.

Referring now to FIG. 11, a schematic illustration of exemplar hardware components 1100 that can be used to execute implementations of the present disclosure is provided. The system 1100 can be used for the operations described in association with the methods described in accordance with implementations of the present disclosure. For example, the system 1100 may be included in the application server 102. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit. The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device. The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for input/output (I/O) profiling, the method comprising the following steps performed by one or more processors:
   executing a virtual machine configured to execute a plurality of applications running on the virtual machine, the plurality of applications configured to perform a plurality of I/O operations;
   performing a first I/O operation by one of the plurality of applications running on the virtual machine, wherein the first I/O operation comprises opening a file or opening a network connection;
   storing, by the one or more processors, meta information for the first I/O operation in an I/O information holder for the virtual machine, wherein storing the meta information comprises storing the meta information at a position in an array of the I/O information holder based on a descriptor for the opened file or opened network connection;
   the one or more processors receiving a request to begin an I/O profiling session on the application that performed the first I/O operation after storing the meta information; and
   reporting, by the one or more processors, an I/O event record for a second I/O operation performed by the application that performed the first I/O operation using the meta information stored for the first I/O operation, wherein the second I/O operation is performed after beginning the I/O profiling session on the application that performed the first I/O operation, wherein the second I/O operation comprises using the file or network connection opened by the first I/O operation.

2. The method of claim 1, wherein the meta information comprises: a name of a file or network connection, and a time stamp.

3. The method of claim 1, further comprising synchronizing access to the array at the position.

4. The method of claim 1, wherein the I/O information holder comprises a hash table, and wherein storing the meta information comprises storing the meta information in the hash table using a descriptor for a file or network connection to determine a hash table key.

5. The method of claim 4, further comprising synchronizing access to the hash table.

6. The method of claim 1, wherein the I/O information holder comprises an array and an overflow hash table, and wherein storing the meta information comprises determining that a descriptor for a file or network connection has a value greater than a size of the array and storing the meta information in the overflow hash table.

7. The method of claim 1, wherein first I/O operation comprises opening an archive file, and wherein the second I/O operation comprises performing an I/O operation on a sub-file within the archive file, and wherein reporting the I/O event record comprises reporting an archive I/O event record for the archive file and a sub-file I/O event record for the sub-file.

8. The method of claim 1, wherein reporting the I/O event record comprises combining the I/O event record with method parameter trace data.

9. The method of claim 1, wherein the I/O event record includes a stack trace, a thread identifier, and an operation duration.

10. A non-transitory computer-readable storage medium coupled to one or more processors and having instructions stored thereon which, when executed by the one or more processors, cause the one or more processors to perform operations comprising:
    executing a virtual machine configured to execute a plurality of applications running on the virtual machine, the plurality of applications configured to perform a plurality of I/O operations;
    performing a first I/O operation by one of the plurality of applications running on the virtual machine, wherein the first I/O operation comprises opening a file or opening a network connection;
    storing, by the one or more processors, meta information for the first I/O operation in an I/O information holder for the virtual machine, wherein storing the meta information comprises storing the meta information at a position in an array of the I/O information holder based on a descriptor for the opened file or opened network connection;
    the one or more processors receiving a request to begin an I/O profiling session on the application that performed the first I/O operation after storing the meta information; and
    reporting, by the one or more processors, an I/O event record for a second I/O operation performed by the application that performed the first I/O operation using the meta information stored for the first I/O operation, wherein the second I/O operation is performed after beginning the I/O profiling session on the application that performed the first I/O operation, wherein the second I/O operation comprises using the file or network connection opened by the first I/O operation.

11. The non-transitory computer-readable storage medium of claim 10, wherein the meta information comprises: a name of a file or network connection, and a time stamp.

12. The non-transitory computer-readable storage medium of claim 10, the operations further comprising synchronizing access to the array at the position.

13. The non-transitory computer-readable storage medium of claim 10, wherein the I/O information holder comprises a hash table, and wherein storing the meta information comprises storing the meta information in the hash table using a descriptor for a file or network connection to determine a hash table key.

14. The non-transitory computer-readable storage medium of claim 13, the operations further comprising synchronizing access to the hash table.

15. The non-transitory computer-readable storage medium of claim 10, wherein the I/O information holder comprises an array and an overflow hash table, and wherein storing the meta information comprises determining that a descriptor for a file or network connection has a value greater than a size of the array and storing the meta information in the overflow hash table.

16. The non-transitory computer-readable storage medium of claim 10, wherein first I/O operation comprises opening an archive file, and wherein the second I/O operation comprises performing an I/O operation on a sub-file within the archive file, and wherein reporting the I/O event record comprises reporting an archive I/O event record for the archive file and a sub-file I/O event record for the sub-file.

17. The non-transitory computer-readable storage medium of claim 10, wherein reporting the I/O event record comprises combining the I/O event record with method parameter trace data.

18. The non-transitory computer-readable storage medium of claim 10, wherein the I/O event record includes a stack trace, a thread identifier, and an operation duration.

19. A system comprising a server including a non-transitory computer-readable storage medium coupled to one or more processors and having instructions stored thereon which, when executed by the one or more processors, cause the one or more processors to perform operations comprising:
    executing a virtual machine configured to execute a plurality of applications running on the virtual machine, the plurality of applications configured to perform a plurality of I/O operations;
    performing a first I/O operation by one of the plurality of applications running on the virtual machine, wherein the first I/O operation comprises opening a file or opening a network connection;
    storing, by the one or more processors, meta information for the first I/O operation in an I/O information holder for the virtual machine, wherein storing the meta information comprises storing the meta information at a position in an array of the I/O information holder based on a descriptor for the opened file or opened network connection;
    the one or more processors receiving a request to begin an I/O profiling session on the application that performed the first I/O operation after storing the meta information; and
    reporting, by the one or more processors, an I/O event record for a second I/O operation performed by the application that performed the first I/O operation using the meta information stored for the first I/O operation, wherein the second I/O operation is performed after beginning the I/O profiling session on the application that performed the first I/O operation, wherein the second I/O operation comprises using the file or network connection opened by the first I/O operation.

20. The system of claim 19, wherein the meta information comprises: a name of a file or network connection, and a time stamp.

* * * * *